United States Patent
Wang et al.

(10) Patent No.: US 8,704,711 B2
(45) Date of Patent: Apr. 22, 2014

(54) WIRELESS CABLE

(75) Inventors: Zizhou Vincent Wang, Fanling (HK);
Hang Ching Jason Leung, Yuen Long
(HK); Piu Bill Wong, Causeway Bay
(CN); Douglas R. George, Kowloon
(CN)

(73) Assignee: FiMax Technology Limited, George
Town, Grand Cayman (KY)

( * ) Notice: Subject to any disclaimer, the term of this
patent is extended or adjusted under 35
U.S.C. 154(b) by 279 days.

(21) Appl. No.: 13/218,099

(22) Filed: Aug. 25, 2011

(65) Prior Publication Data

US 2013/0050021 A1 Feb. 28, 2013

(51) Int. Cl.
*H01Q 3/00* (2006.01)

(52) U.S. Cl.
USPC ............... 342/359; 342/371; 343/757

(58) Field of Classification Search
USPC ............. 342/77, 78, 359, 367, 371; 343/754, 343/757, 763
See application file for complete search history.

(56) References Cited

U.S. PATENT DOCUMENTS

| | | | | |
|---|---|---|---|---|
| 4,801,940 A | * | 1/1989 | Ma et al. | 342/359 |
| 5,515,058 A | * | 5/1996 | Chaney et al. | 342/359 |
| 5,927,415 A | * | 7/1999 | Ibaraki et al. | 180/65.25 |
| 7,162,395 B1 | * | 1/2007 | Holmes et al. | 702/188 |
| 2005/0216937 A1 | * | 9/2005 | Shintani et al. | 725/72 |

* cited by examiner

*Primary Examiner* — Dao Phan
(74) *Attorney, Agent, or Firm* — Fulbright & Jaworski LLP

(57) ABSTRACT

The present invention is directed to systems and methods for enhancing link integrity between two wireless cable devices through automatic link acquisition and tracking. Embodiments of the invention utilize inexpensive motors and control components to automatically enhancing signal strength between a first wireless cable device and a second wireless cable device. Either the first wireless cable device, the second wireless cable device, or both may include an omnidirectional wireless antenna. Alternatively, the first wireless cable device, the second wireless cable device, or both may include a directional antenna. In another embodiment, the first wireless cable device, the second wireless cable device, or both may include both an omnidirectional antenna and a directional antenna.

39 Claims, 9 Drawing Sheets

WIRELESS CABLE

TECHNICAL FIELD

The present invention relates generally to data communications and, more particularly, to techniques for wireless cabling.

BACKGROUND OF THE INVENTION

Retrofitting and installation of networks and systems in existing or new build construction typically requires interconnection of multiple devices. For example, installation of data networks may require interconnection of multiple networks devices, including data routers, switches, access points, servers, data storage devices, and the like. Previously, installation of such networks required extensive installation or retrofitting of wired cabling. For example, typical networks may require installation of hundreds of feet of Category 5 Ethernet cable or other wired cable media.

Another problem with previous network systems is the use of multiple types of wired media. For example, a network may include a fiber optic trunk terminated by a fiber modem. The fiber modem may be connected to a data switching device using gigabit Ethernet cables. The switching device may be connected to multiple remote devices using various different versions of 100 or 10 base Ethernet cables. In such a network, it may be extremely difficult to reorganize, upgrade, or replace network devices because such changes may require complete reinstallation of network cables. To overcome such challenges, many network architects and builders install redundant cable, and multiple spares of the various wired media. Although often very effective, such redundant networks can be extremely costly. Moreover, much of the cost is wasted because many of the redundant cables remain unused.

Similar problems exist in home networks and multimedia systems. For example, a homeowner may wish to install distributed home audio systems, home theater systems, home data networks or other networks and systems that typically require wired connections. For example, a home media center may include a Video Home System (VHS) tape player, a Digital Video Recorder (DVR), a media server, a Digital Video Disc (DVD) player, a Blu-ray disc player, a television or projector, an audio receiver and amplifier, and one or more audio speakers. In a typical configuration, the VHS tape player may be connected to the projector by RCA cables, the DVR may be connected to a coaxial cable. The DVR may also be connected to the projector by a High-Definition Multimedia Interface (HDMI) cable. The Blu-ray disc player may be connected to the projector by an HDMI cable, and may be connected to the audio receiver by a fiber optic cable. The audio receiver may be connected to several different speakers in various locations by multiple two-wire speaker cables. In such systems, the diverse cables may be costly and difficult to install. Additionally, it may be difficult to manage these cables neatly. In particular, it may be very difficult to retrofit such systems in buildings that were not originally designed or installed with these cables. For example, installation of the cables may require partial demolition, and reconstruction of walls, ceilings, floors, woodwork, and other structural members of the building. Not only are the cables costly, and difficult to install, but it may also be costly and labor intensive to perform the required construction.

Previous solutions to these problems have included wireless communications between devices. Some wireless links have been established using Infrared (IR) communication links, Bluetooth communication links, and Wi-Fi links such as IEEE 802.11 links. Unfortunately, typical systems face several limitations because of the complex environment in which they may be installed. For example, IR solutions typically only work in direct line-of-sight environments. So, room-to-room communications are typically not feasible with IR communication links. Similarly, Bluetooth links typically only have a short range of communication. For example, most Bluetooth devices only communicate within a ten to fifteen foot radius. Typical Wi-Fi systems may also have limitations due to environmental factors such as multipath fade, signal interference, and the like. For example, a typical commercial environment may require communication between multiple floors and across several rooms and hundreds of feet. A typical home environment may include signal interference sources, such as microwave ovens.

BRIEF SUMMARY OF THE INVENTION

The present invention is directed to systems and methods for enhancing link integrity between two wireless cable devices through automatic link acquisition and tracking. Embodiments of the invention utilize inexpensive motors and control components to automatically enhance signal strength between a first wireless cable device and a second wireless cable device. Either the first wireless cable device, the second wireless cable device, or both may include an omnidirectional wireless antenna. In one embodiment, the first wireless cable device, the second wireless cable device, or both may include a directional antenna. For example, the directional antennas may be patch antennas formed on a substrate, such as a Printed Circuit Board (PCB). In another embodiment, the first wireless cable device, the second wireless cable device, or both may include both an omnidirectional antenna and a directional antenna.

According to an embodiment of the invention, a directional antenna associated with either the first or the second wireless cable device may be automatically oriented toward the other wireless cable device to improve antenna gain and enhance signal strength.

In one embodiment, a system may be configured for point-to-point communication. In such an embodiment, the system may include a first wireless cable device and a second wireless cable devices. The second wireless cable device may align its antenna in the direction of the first wireless cable device. In a further embodiment, the system may be configured for point-to-multipoint communications. In such an embodiment, the first wireless cable device may be a master and the second wireless cable device may be a slave. In such an embodiment, the system may include multiple second wireless cable devices.

An embodiment may include an electronic motor for adjusting a look-angle of a directional antenna. The motor may be controlled by a motor controller configured to perform a multi-step acquisition algorithm. The multi-step antenna acquisition algorithm may include scanning an environment to locate one or more responsive remote devices and searching for an optimal antenna angle for communication with the responsive remote device.

In one embodiment, the method may include performing a multi-level angle optimization algorithm which includes coarse tuning and fine tuning process to detect signals from a second device and determine the optimal angle of the directional antenna, started by a first device. In some embodiments, the coarse tuning method may scan an environment to identify remote devices capable of data communications. In particular, the coarse tuning method may scan three hundred and sixty degrees or more. The coarse tuning method may include scanning the environment in rotation steps that are larger relative to the rotation steps of the fine tuning method.

In one embodiment, the fine tuning method may use information collected during the coarse tuning method to identify an optimal look angle for the directional antenna. In a particular embodiment, the fine tuning method may rotate the directional antenna in rotational steps that are small relative to the rotational steps used in the coarse tuning method. In certain embodiments, the coarse tuning method may generate candidate angles for use in the fine tuning method.

Multiple candidate angles may be selected in multipath environments, where there may be local maximums in signal strength from signal reflections. In such embodiments, each candidate angle may go through a fine tuning process to find the optimal angle of the directional antenna, thus avoiding locking onto a local maximum that is not the true maximum. In one embodiment, the rotation speed that is suitable for fine tuning may be lower than the rotation speed that is suitable for coarse tuning.

In addition to, or in the alternative to, the forgoing multi-level angle optimization algorithm, embodiments of the invention further provide a method consisting of a scanning and searching process to scan an environment to identify a peak signal parameter and search that environment to determine an antenna position corresponding to the peak signal parameter. In such an embodiment, the scanning method may include rotating the directional antenna at a first rotation speed to identify a remote wireless cable device. If it is determined that a response is received from a remote wireless cable device, the rotation speed may be reduced and parameters received from either the RF equipment or the baseband equipment may be recorded. The scanning method may also include comparing the difference between the most recent recorded signal parameters. For example, if it is determined that the signal parameter of a first received signal is better than the signal parameter of a second received signal, the rotation speed may be further reduced. In such an embodiment, there may be more than two reduced speeds. In one embodiment, the scanning method may end if a time threshold is reached. In another embodiment, the scanning method may end if a physical or mechanical stop point is reached. In certain embodiments, the scanning method may determine a peak signal parameter for use in the searching method.

In a further embodiment, the searching method may include selecting a first rotation speed to rotate the directional antenna to request for a response from a remote device. In such an embodiment, signal parameters may be recorded at multiple points. The searching method may also include comparing the signal parameter recorded at each point with the peak signal parameter identified during the scanning process to identify an optimal look angle.

Embodiments of a method for ensuring diversity of antenna rotation speeds during an antenna scan are also described. In one embodiment, the method starts when the directional antenna transmits a wireless signal that includes a request for a response from a remote device. If the controller determines that a response was received, the method ends. If a response is not received, then the controller determines whether a time limit has arrived. In one embodiment, the time limit is the inverse of the current rotation speed. Other embodiments may include other time limits. The directional antenna may continue to send signals and request responses at the same rotation speed until the controller determines that the time limit has been reached. Once the time limit has been reached, the controller is configured to change the rotation speed of the directional antenna. Accordingly, the rate of rotation of the directional antenna on the first wireless cable device may be set to a different rotation speed than the directional antenna of the second wireless cable device. Alternatively, the process may be repeated at multiple different speeds to ensure discovery of all devices in a wireless cable environment.

In one embodiment, the antenna directions may be optimized in cooperation with the remote wireless cable device. Optimizing may include stopping rotation of remote antenna and using the directional antenna to determine a direction associated with an optimal signal parameter level. For example, optimization may include using the directional antenna to perform a coarse tuning and fine tuning process described above to identify an optimal angle. Alternatively, the optimized angle may be located using the scanning and searching processes described above. Optimizing may also include stopping rotation of the antenna and instructing a remote wireless cable device to identify an optimal antenna position. In one embodiment, the optimizing method described above may repeat until a time threshold is reached.

Embodiments of a method for automatic detection of a signal and tuning of an antenna angle in a wireless cable device having both an omnidirectional antenna and a directional antenna are also described. In one embodiment, the method may include first checking whether a link may be established using only the omnidirectional antenna, and then if the omnidirectional antenna fails to establish a link, the directional antenna may be manipulated by the antenna controller to establish a link. Establishing a link with the directional antenna may be achieved using either the coarse/fine tuning method or the scan/search methods described. If the wireless antenna device fails to establish a link by any of these methods, the methods for ensuring diversity of antenna rotation speeds and optimizing as described above may be used.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1A:
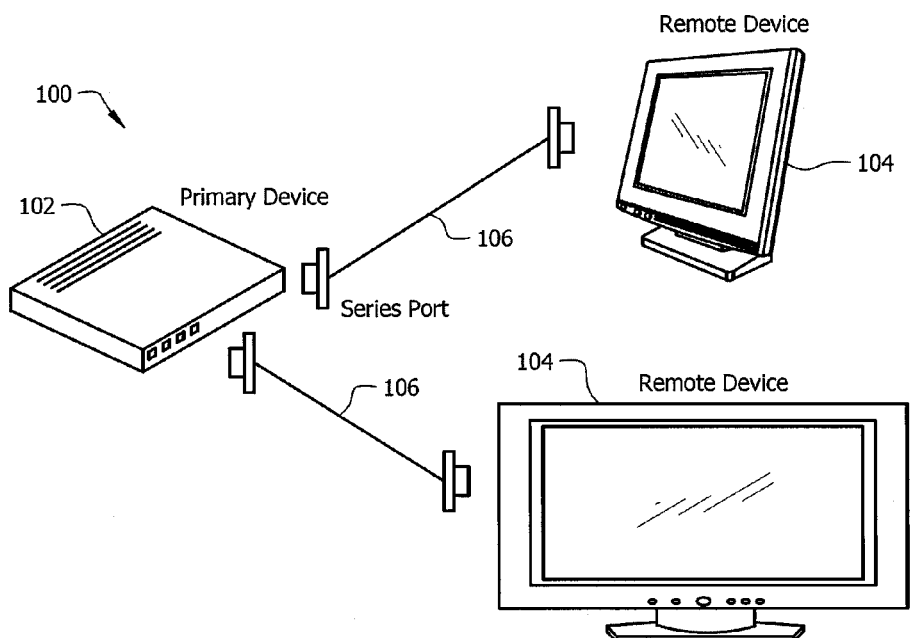
FIG. 1A is a schematic block diagram illustrating a wired system for point-to-multipoint communications.
Figure 1B:
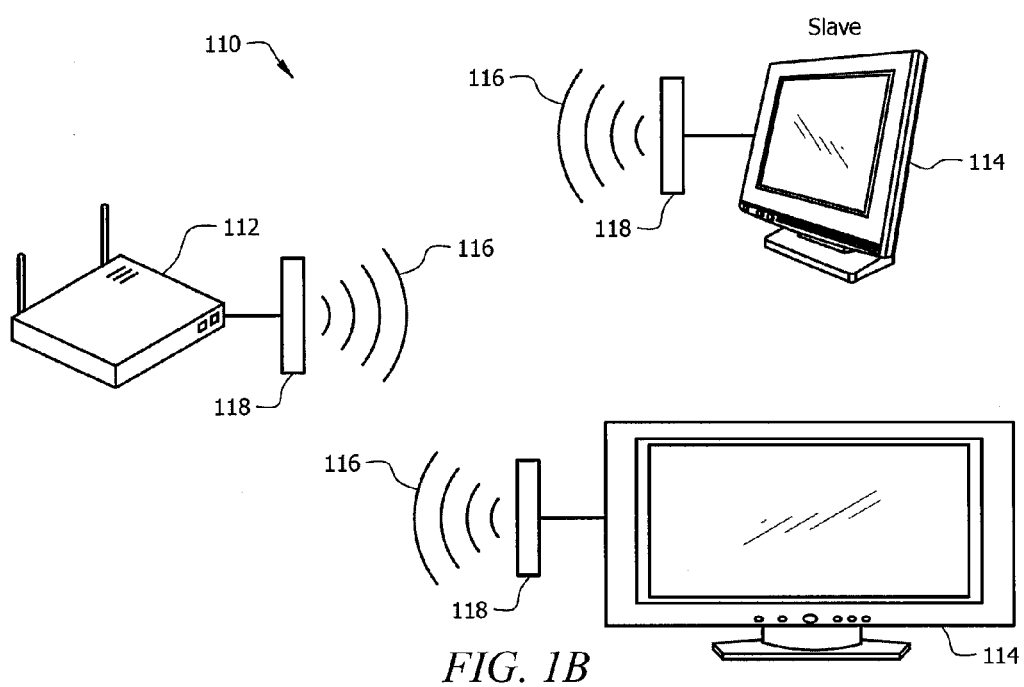
FIG. 1B is a schematic block diagram illustrating of a wireless cable system according to one embodiment of the present invention.

FIG. 1A illustrates an embodiment of a wired cable system 100. FIG. 1B illustrates an embodiment of a wireless cable system 110 suitable for replacement of the wired cable system 100 illustrated in FIG. 1B.

As illustrated in FIG. 1A, an embodiment of a wired cable system 100 may include a primary device 102 coupled to one or more remote devices 104 by wired cables 106. For example, a desktop computer may be a primary device 102. The desktop computer 102 may be coupled to one or more monitors by a wired cable 106. For example, the wired cable 106 may be a serial cable. In another embodiment, the remote device 104 may be a printer. The cable 106 connecting the desktop computer to the printer may be a parallel cable or an Ethernet cable.

In another embodiment, the primary device 102 may be a networking device. For example, the primary device 102 may be a network router. The network router 102 may be coupled to one or more remote network devices 104, such as a storage device, a server, a network data switch, a network data hub, a firewall device, or the like. Indeed, one of ordinary skill in the art will recognize a variety of devices that may be configured according to the embodiment of FIG. 1. In such embodiments, the primary device 102 may be coupled to the remote devices 104 by one or more wired cables 106. The cables 106 may be, for example, Category 5 Ethernet cables, fiber optic cables, serial data cables, parallel data cables, and other suitable cables for coupling network devices 102, 104 in point-to-point, or point-to-multipoint, communication.

Wired cable system 100 may be replaced by embodiments of wireless cable system 110 as illustrated in FIG. 1B. For example, the primary device 102 may be replaced by a first wireless cable device 112 configured to wirelessly communicate with one or more second wireless cable devices 114 over one or more wireless data links 116.

For illustrative purposes, the following examples are described in the context of a first device and a second device. For simplification of the description of the drawings, the first device will be referred to as first wireless cable device 112 and the second device will be referred to as second wireless cable device 114. However, one of ordinary skill in the art will recognize that the first wireless cable device 112 and the second wireless cable device 114 may be interchanged in various embodiments.

In one embodiment, the first wireless cable device 112 may be configured according to the embodiments described below with relation to FIG. 2. In another embodiment, the second wireless cable devices 114 may be configured as wireless cable device 200 according to embodiments described in FIG. 2. In further embodiments, both the first wireless cable device 112 and the second wireless cable devices 114 may be configured as wireless cable device 200 according to the embodiments of FIG. 2. In such embodiments, the wired cables 106 may be replaced by wireless data links 116. In one embodiment, the wireless cable apparatus 200 illustrated in FIG. 2 may be integrated with the first and second wireless devices 112, 114. Alternatively, the apparatus 200 may be a stand-alone component 118 as illustrated in FIG. 1.

Figure 2:
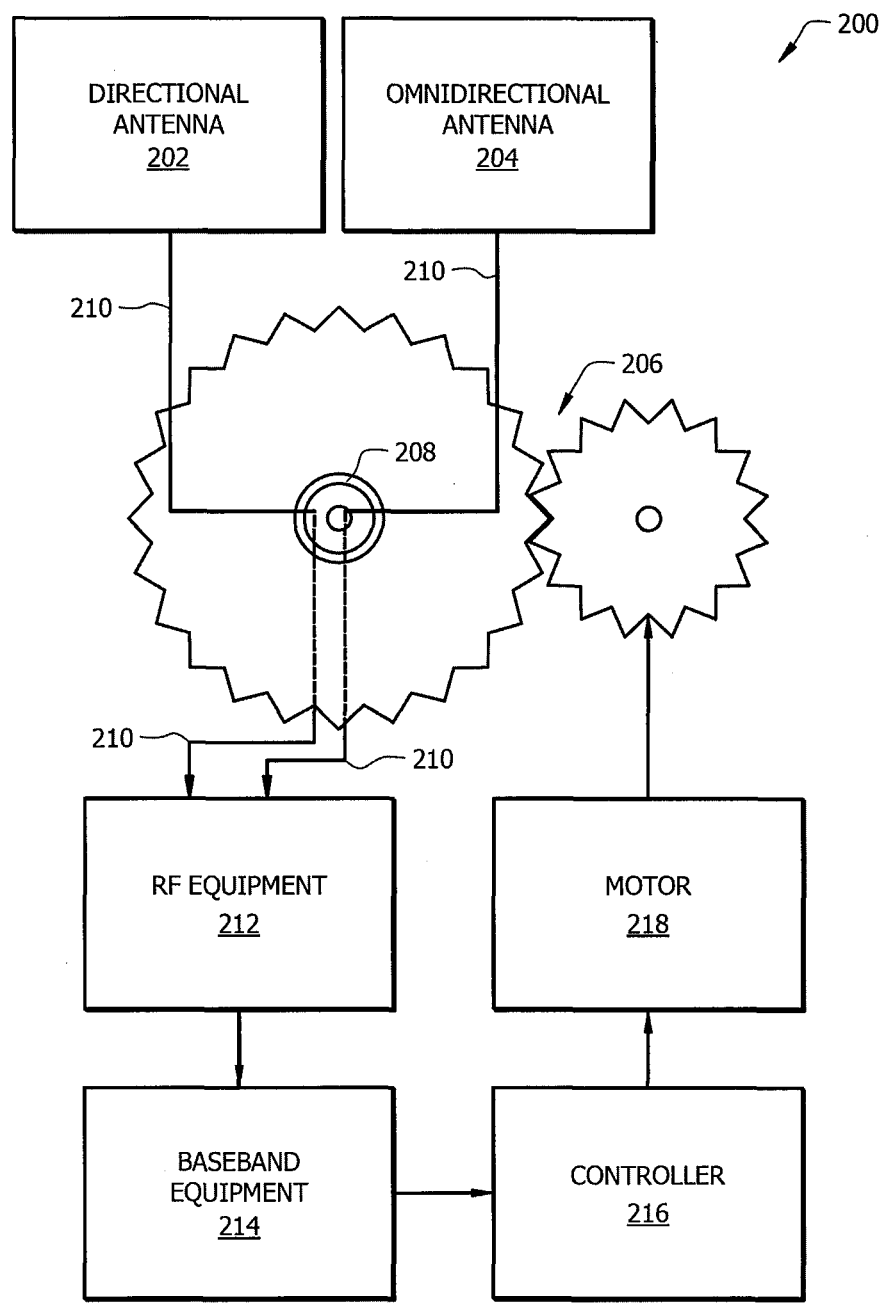
FIG. 2 is a schematic block diagram of a wireless cable device according to one embodiment of the present invention.

FIG. 2 is a schematic block diagram of a wireless cable device 200 according to one embodiment of the present invention. In one embodiment, the wireless cable device 200 includes one or more directional antennas 202. In another embodiment, the wireless cable device 200 includes one or more omnidirectional antennas 204. In a further embodiment, the wireless cable device 200 may include both one or more directional antenna 202 and one or more omnidirectional antenna 204. In addition, the wireless cable device 200 may include a rotatable mounting assembly 206, RF equipment 212, baseband equipment 214, and a controller 216. The present embodiments may be used with wireless devices 200 configured according to one or more of a variety of communication standards, such as IEEE 802.11, Universal Mobile Telecommunications System (UMTS) Global System for Mobile Communications (GSM), Third Generation (3G) GSM, Fourth Generation (4G) GSM, Code Division Multiple Access (CDMA) 2000, or the like. One of ordinary skill in the art will recognize a variety of standards by which the RF equipment 212, baseband equipment 214, and antennas 202, 204 may be configured.

As illustrated, the directional antenna 202 may be coupled to a rotatable mounting assembly 206. For example, the rotatable mounting assembly 206 may include one or more sprockets or gears. One of ordinary skill in the art will recognize a variety of rotation means that may be suitable for the present invention, including belts, direct drive assemblies, and the like. In a particular embodiment, the rotatable mounting assembly 206 may be configured to accommodate Radio Frequency (RF) cables 210 that may run between the antennas 202, 204 and the RF equipment 212. For example, a sprocket or gear may include a hole 208 that allows the RF cables 210 to pass through to the antennas 202, 204. In particular, rotatable mounting assembly 206 may accommodate the RF cables 210 such that the RF cables 210 are not damaged during rotation of the rotatable mounting assembly 206 and the antennas 202, 204. In various embodiments, the rotatable mounting assembly may include multiple means for mounting. Additionally, the rotatable mounting assembly 206 may be rotatable along multiple axes. For example, the rotatable mounting assembly 206 may cause the directional antenna 202 to rotate on lateral and/or vertical axis.

Embodiments of RF equipment 212 may include amplifiers, filters, microstrip connections, RF cable ports, frequency conversion circuitry, one or more radio transmitters, receivers, and/or transceivers and the like. In a particular embodiment, the RF equipment 212 may be configured to generate an RF signal at or around 2.4 GHz. The RF equipment 212 may receive RF signals from, for example, the directional antenna 202 at a similar frequency. Alternatively, the RF equipment 212 may be configured to operate at 5 GHz. One of ordinary skill in the art will recognize other suitable frequency bands, and RF configurations that may be suitable for use with the present embodiments. In further embodiments, the RF equipment may be configured for dual-band operation, or operation on more than two frequency bands. For example, in a WiMAX system configured according to the Institute of Electrical and Electronics Engineers (IEEE) 802.16 standard, the communication band may be at 2.3 GHz, 2.5 GHz, 3.5 GHz, or the like.

The baseband equipment 214 may include, for example, a digital signal processor (not shown). Additionally or alternatively, the baseband equipment 214 may include a microprocessor, a Field Programmable Gate Array (FPGA), or the like. In particular, the baseband equipment 214 may include hardware configured to modulate and demodulate data, encode and decode data, perform error correction algorithms, and the like. In particular, the baseband equipment may be configured to determine a Bit Error Rate (BER), a Signal to Interference-plus-Noise Ratio (SINR), and/or other link quality metrics on a received wireless link.

In various embodiments, the RF equipment 212, the baseband equipment 214, and/or the antennas 202, 204 may be connected to the controller 216. Accordingly, the controller 216 may be configured to receive signals from one or more of the antennas 202, 204, the RF equipment 212, and the baseband equipment 214. For example, in an embodiment, the controller 216 may detect a signal to noise ratio on signals received by the antenna 202. The controller 216 may receive the signal from the antenna 202 directly, or from the RF equipment 212. In another embodiment, the controller 216 may receive a BER signal, or other signals indicative of signal quality, from the baseband equipment 214.

In one embodiment, the controller 216 receives a SINR signal from the baseband equipment 214. In another embodiment, the controller 216 receives a BER signal from the baseband equipment. In still another embodiment, the controller 216 monitors a signal strength level received from the RF equipment 212. For example, the RF equipment 212 may include a coupler configured to provide a sample of the signal received by the antennas 202, 204 to the controller 216. One of ordinary skill in the art will appreciate additional signal metrics that may be used to determine a signal quality level by the controller 216.

The controller 216 may also include measurement circuitry configured determine a value of the signal metrics received from the RF equipment 212 or the baseband equipment 214. In particular, the controller 216 may include circuitry for signal sampling and analog-to-digital conversion, signal level comparison and tracking, or the like. In one embodiment, the circuitry may include analog circuit components, such as operational amplifiers, comparators, capacitors, and the like. Alternatively, the circuitry may include digital circuitry such as A/D converters, and digital logic gates such as AND, OR, XOR, and inversion gates.

In a further embodiment, the controller 216 may include a control circuit. The control circuit may include a microcontroller, an FPGA, a DSP, or similar programmable control components. In such an embodiment, the control circuit may be configured with software or firmware configured to cause the controller 216 to perform the operations described in the flowcharts of FIGS. 3-7 and 9 below. In another embodiment, the control circuitry may include analog or digital circuit components configured to operate according to the process of FIGS. 3-7 and 9. For example, an embodiment, may include a latch for storing a highest received signal value, a comparator for comparing a received signal value with the highest received signal value stored in the latch, a counter circuit or switch for controlling motor steps, and an amplifier for driving the motor in response to an input signal from the counter circuit or switch.

The controller 216 may include motor drive circuitry configured to drive the motor 218 according to the present embodiments. For example, the motor drive circuitry may include one or more driver amplifiers. The driver amplifier may receive a motor drive signal from a microcontroller or other control circuitry in the controller 216. The motor drive signal may cause the amplifier to drive the motor 218 in either a forward or reverse direction. Additionally, the motor drive signal may determine the speed of the motor 218.

The controller 216 may provide a control signal, such as a Direct Current (DC) signal, to the motor 218. The motor 218 may be, for example, the motor 218 may be a DC brushed motor, a DC brushless motor, or the like. In a particular embodiment, the motor 218 may be an inexpensive DC motor, such as those used inexpensive toys or models. The motor 218 may set a position of the directional antenna 202. For example, the motor 218 may drive a gear or sprocket 206 causing the antenna position to be adjusted. The motor 218 may set a rotational angle and/or an elevation angle. In another embodiment, the antenna may be positioned in three axes. In a further embodiment, the wireless cable device 200 may include multiple motors 218, each configured to set a position of the directional antenna 202 in a different axis.

In one embodiment, both the first wireless cable device 112 and the second wireless cable device 114 may use a single antenna. In such an embodiment, the transmission and reception of the traffic flow between devices is done using a single antenna residing at both devices. The antenna can be further classified into two types: omnidirectional 204 and directional 202. In certain embodiments, the use of single antenna could be enhanced by using antenna diversity, which makes the receiver obtain a multiple observations of the same signal sent by the transmitter and hence enables it to recover the transmitted signal with a higher degree of accuracy. One example is a cross-polarization patch antenna which supports 2×2 diversity and can effectively improve the transmission and reception of the traffic flow through 802.11n protocol.

In one embodiment, both the first wireless cable device 112 and the second wireless cable device 114 may include omnidirectional antennas 204. In certain embodiments, each of the wireless cable devices 112 and 114 may only include omnidirectional antennas. This case is usually for short-range wireless communication since an omnidirectional antenna radiates power equally in all directions. In some embodiments, the two devices, 112, 114 can launch the data exchange as long as one detects a signal from the other. In such an embodiment, the antenna controls described above may not be required.

In another embodiment, one of the devices may include an omnidirectional antenna 204, but the other device may include a directional antenna 202. For example, the first wireless cable device 112 may include an omnidirectional antenna 204, but the second wireless cable device 114 may include a directional antenna 202. With the directivity of the antennas, the RF energy of directional antenna 202 is focused in a particular direction that may result in an extended wireless communication range. The directional antenna 202 may be coupled to a motor 218 and control unit 216 as described above, which can turn the directional antenna 202 three-hundred and sixty degrees or more, to detect the signals from the omnidirectional antenna 204. Since the directional antenna 202 is more focused, it could have a higher level of gain provided that its aimed direction (i.e. coverage angle) is fully covered by the omnidirectional antenna 204.

Figure 3:
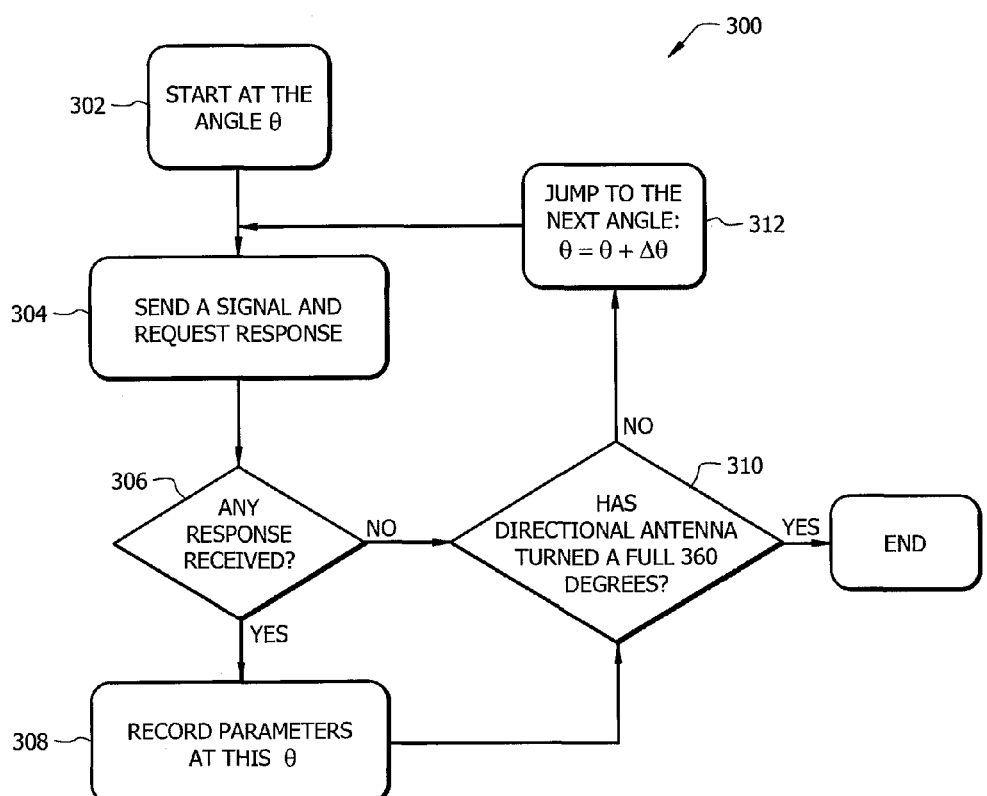
FIG. 3 is a schematic flowchart diagram illustrating a method for coarse tuning a signal acquisition according to one embodiment of the present invention.
Figure 4:
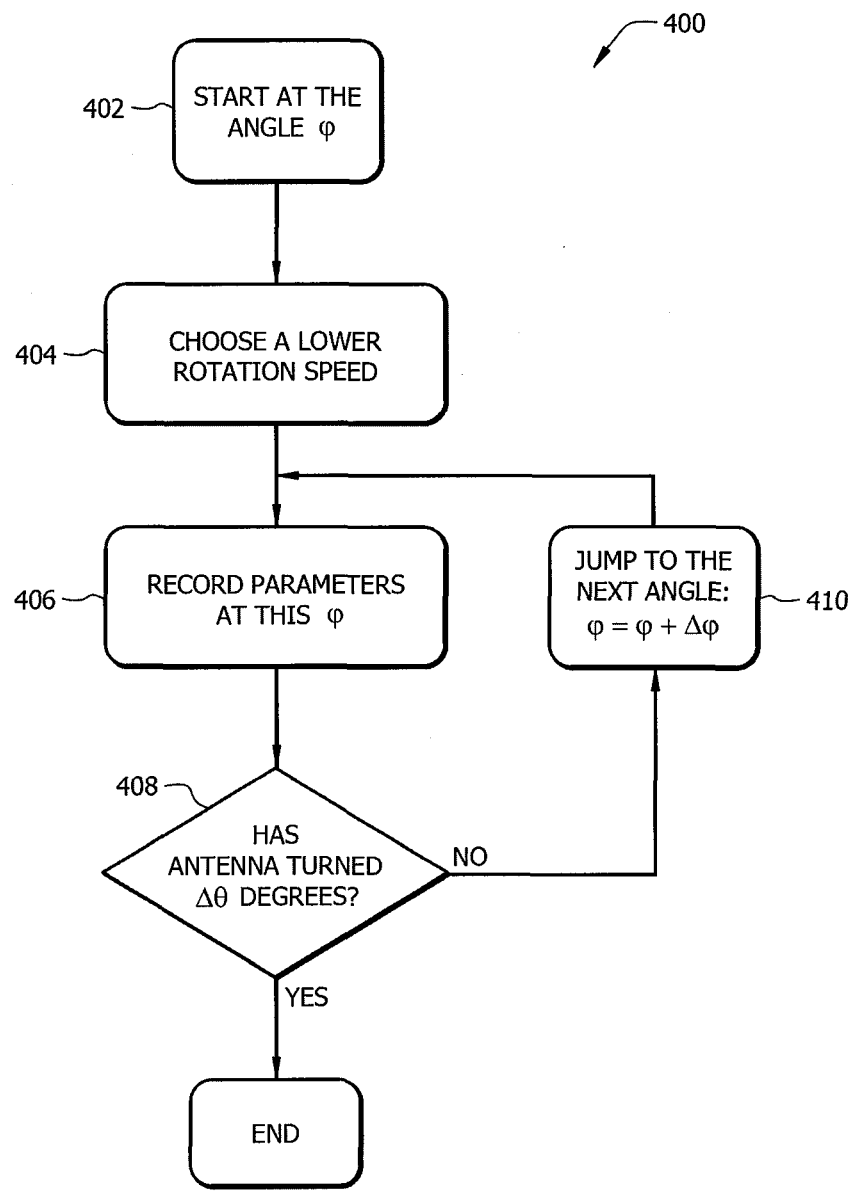
FIG. 4 is a schematic flowchart diagram illustrating a method for fine tuning a signal acquisition according to one embodiment of the present invention.

FIGS. 3-4 show a multi-level angle optimization algorithm which comprises coarse tuning (including signal detection) and fine-tuning process to detect signals from a second device and determine the optimal angle of the directional antenna, started by a first device. In some embodiments, the coarse tuning method 300 may scan an environment to identify remote devices capable of data communications. In particular, the coarse tuning method 300 may scan three hundred and sixty degrees or more. The coarse tuning method 300 may include scanning the environment in rotation steps that are larger relative to the rotation steps of the fine tuning method 400. In one embodiment, the fine tuning method 400 may use information collected during the coarse tuning method 300 to identify an optimal look angle for the directional antenna 202. In a particular embodiment, the fine tuning method 400 may rotate the directional antenna 202 in rotational steps that are small relative to the rotational steps used in the coarse tuning method 300. An embodiment of a method 300 for coarse tuning is illustrated in FIG. 3, and an embodiment of a method 400 for fine tuning is illustrated in FIG. 4. In certain embodiments, the coarse tuning method 300 of FIG. 3 may generate candidate angles for use in the fine tuning method 400 of FIG. 4. In such an embodiment, the motor 218 may be a precision motor configured to provide a motor position feedback signal to the controller 216. If so, the controller 216 may rely upon the position feedback signal to determine a start and stop points for the motor 218.

FIG. 3 is a schematic flowchart diagram illustrating a method 300 for coarse tuning a signal acquisition. Embodiments of this method 300 may be used for both lateral and vertical signal acquisition. The method 300 starts with the directional antenna 202 positioned 302 at an angle. For example, the gear 206 may allow three hundred and sixty degrees, or more, of rotation. The directional antenna 202 may then send 304 a signal that includes a request for a response from a remote device. In another embodiment, the directional antenna 202 may not send a signal. Rather, the directional antenna 202 may scan for and receive a beacon or pilot signal emitted from a remote device. If the baseband equipment 214 determines 306 that a response was received, the baseband equipment 214 may communicate signal parameters, such as BER or SINR, to the controller 216. The controller 216 may then record 308 the parameters in association with a record of the angle of rotation of the directional antenna 202. If, however, the baseband equipment 214 determines 306 that a response was not received, the controller 216 may determine 310 whether the directional antenna 202 has already turned a full three hundred and sixty degrees. If the directional antenna 202 has not turned a full three hundred and sixty degrees, the controller 216 may cause the motor 218 to move the antenna to a next angle=+ and the process repeats. If, the directional antenna 202 has already turned a full three hundred and sixty degrees, then the process may end.

A report is generated at the conclusion of the method 300. This report lists the recorded parameters (i.e. RSSI, BER, PER, Response time, and the like) with corresponding angles and hence enables the controller 116 to drive the directional antenna 202 to an suitable angle. In one embodiment, the controller 116 may identify some candidate angles (for example, the angles P1, P2, . . . , Pn) whose performance, in terms of a performance factor such as RSSI, BER, or SINR, are similar and better than others. For example, if a particular candidate angle has a better SINR than all other angles, that angle will be chosen. If, however, two or more angles have performance factor levels that are similar to each other, but better than most other angles, each of these candidate angles may be chosen. Multiple candidate angles may be selected in multipath environments, where there may be local maximums in signal strength from signal reflections. In such embodiments, each candidate angle may go through a fine tuning process described below to find the optimal angle of the directional antenna, thus avoiding locking onto a local maximum that is not the true maximum.

FIG. 4 is a schematic flowchart diagram illustrating a method 400 for fine tuning a signal acquisition. The method 400 may start 402 at an angle. In one embodiment, the angle may correspond to a candidate angle identified by the coarse tuning method 300 described above. The controller 216 may then choose 404 a rotation speed for the directional antenna 202 that is suitable for fine tuning and record 406 the parameters at this angle. In one embodiment, the rotation speed that is suitable for fine tuning may be lower than the rotation speed that is suitable for coarse tuning. The method 400 may also include recording 406 parameters at this angle. The controller 216 may then determine 408 whether the antenna 202 has turned degrees, where is an angle increment equal to one step at the higher rotation speed used for coarse tuning. If no, the method 400 may include jumping 410 to a next angle. For example, the controller 216 may cause the motor 218 to rotate the antenna 202 to a next angle=+. If it is determined 408 that the antenna has turned degrees, then the method 400 ends.

In various embodiments, the directional antenna 202 may rotate clockwise, counterclockwise, up, down, or any combination of these. In one embodiment, the directional antenna 202 may follow a corkscrew path. In another embodiment, the directional antenna 202 may scan a substantially spherical, cylindrical, or other three-dimensional space. In one example, the directional antenna 202 may first rotate in a clockwise direction. If the controller 216 determines that the SINR parameter is reduced, it may reverse the direction in which the directional antenna 202 rotates.

Figure 5:
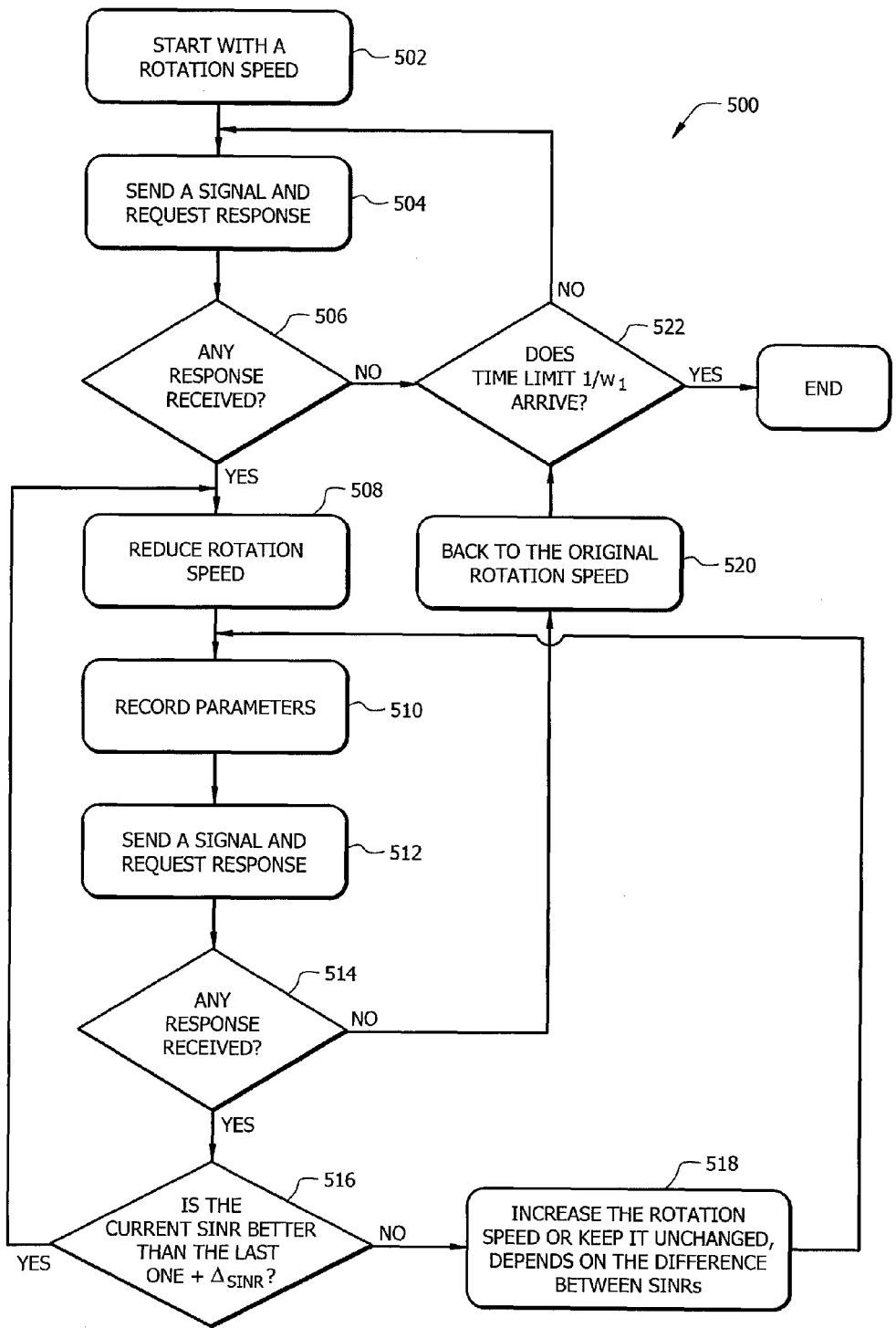
FIG. 5 is a schematic flowchart diagram illustrating a method for conducting an initial scan of an environment to identify signal parameters according to one embodiment of the present invention.
Figure 6:
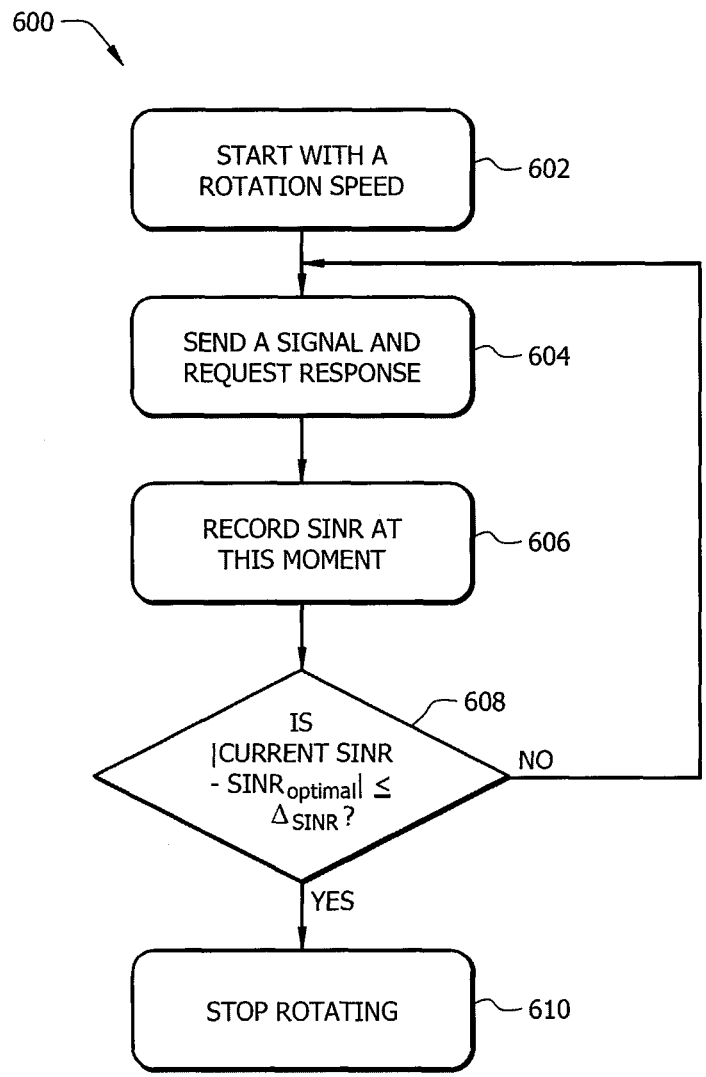
FIG. 6 is a schematic flowchart diagram illustrating one embodiment of a method for searching for an optimal antenna angle in response to the peak signal parameter obtained during an initial scan of an environment.

FIGS. 5 and 6 illustrate another embodiment of a process for identifying an optimal look angle for a directional antenna. Such embodiments may be implemented as an alternative to the methods described in FIGS. 3-4. In one embodiment, the process includes conducting an initial scan of an environment to determine an optimal level of a signal parameter and then searching that environment to determine an antenna look angle corresponding to the optimal level of the signal parameter. An embodiment of the initial scan is illustrated in FIG. 5 and an embodiment of the search is illustrated in FIG. 6. In such an embodiment, the motor 218 may not provide a position feedback signal. If no position feedback signal is provided by the motor 218 to the controller 216, the controller 216 may calculate a maximum and minimum rotation speed. The minimum and maximum rotation speeds of the motor 218 may be represented as w1 rpm and w2 rpm respectively. In such an embodiment, the time required for turning 360 degrees is at least 1/w2 minutes and at most 1/w1 minutes. Thus, the controller 216 may calculate the start and stop position based upon timing with reference to the rotation speed.

FIG. 5 is a schematic flowchart diagram illustrating a method 500 for conducting an initial scan of an environment to identify signal parameters. In an embodiment, the method 500 starts when the controller 216 selects 502 a first rotation speed. The rotation speed may be preset. Alternatively, the rotation speed may be selected at random. The directional antenna 202 may then transmit 504 a signal containing a request for a response from a remote device. Alternatively, the directional antenna 202 may listen for a pilot signal or beacon signal transmitted by a remote device. The request for response may be generated by, for example, the baseband equipment 214 and the RF equipment 212 For example, a directional antenna 202 on a first wireless cable device 112 may transmit 504 a signal to a second wireless cable device 114. The signal may contain a request for a response from the second wireless cable device 114.

If it is determined 506 that a response is received, the controller 216 may reduce 508 the rotation speed of the motor 218 to a first reduced speed and record 510 parameters received from either the RF equipment 212 or the baseband equipment 214. The directional antenna 202 may then send 512 another signal and request another response. In other embodiments, the controller 216 may cause the directional antenna 202 to rotate at more than two speeds. For example, the controller 216 may provide continuous rotation control to the motor causing the directional antenna 202 to rotate and a variety of different speeds depending on the signal parameters. In particular, as the signal parameters continue to improve, the controller 216 may cause the directional antenna 202 to rotate at a continuously slower rate.

If it is determined 514 that another response was received, the controller may determine 516 whether the SINR of the first signal is better than the SINR of the second signal. If yes, the controller 116 may reduce 508 the rotation speed of the motor 218 further to a second reduced speed and the process repeats until it is determined that the SINR of a received signal is worse than the SINR of the previously received signal. Once this determination 516 is made, the controller 216 may increase 518 the rotation speed back to the first reduced speed. In another embodiment, the controller 216 may keep the rotation speed unchanged at the second reduced speed, if for example, the difference in SINR is small. The parameter is recorded 510 by the controller 216 and the process continues until a determination 514 is made that no response was received.

Once no response is received, the controller 216 may adjust 520 the rotation speed back to the original speed established in step 502 and send 504 another signal and request for response. In one embodiment, this process continues until a time threshold is reached, in which case, the method 500 ends. In a particular embodiment, the time threshold is the inverse of the minimum rotation speed in rotations per minute. For example, if the minimum rotation speed is 0.1 rpm, then the time threshold may be ten minutes. In one embodiment, a hardware clock or other time detection mechanism may provide information sufficient to determine that the motor 218 has rotated 180 or 360 degrees.

This method 500 may effectively generate a map of signal strengths in an environment. In some embodiments, the map may be tied to specific angles at which signal levels are determined. In other embodiments, method 500 may simply identify signal information used by the searching method 600 of FIG. 6 to determine an optimal antenna look angle. For example, the method 500 may identify an optimal SINR value used for comparison in the search method 600 of FIG. 6.

FIG. 6 is a schematic flowchart diagram illustrating one embodiment of a method 600 for searching for an optimal antenna angle in response to signal parameters obtained during an initial scan of an environment described in FIG. 5. In the illustrated embodiment, the method 600 starts with the controller 216 selecting 602 an initial rotation speed. The directional antenna 202 then transmits 604 a signal containing a request for a response from a remote device. Alternatively, the directional antenna 202 may listen for a beacon or pilot signal emitted by a remote device. As described above, the signal may be generated by the baseband equipment 214 and the RF equipment 212. The controller 216 records 606 the SINR. The controller 216 may then determine 608 whether the magnitude of the difference between the SINR at the current location and the optimal SINR recorded by the method 500 described in FIG. 5 is less than or equal to the magnitude of the change in SINR from the previous angle. If no, then the process may continue. If yes, the controller 216 may cause the motor 218 to stop 610 rotating and hold in its current position.

As discussed above, the ability of a directional antenna 202 to focus its beam has the effect of providing more energy in a particular direction. As the gain of a directional antenna 202 increases, the coverage distance increases, but the effective coverage angle decreases. So this case can provide enhanced wireless communication according to the presently described methods for signal detection and angle optimization.

Figure 7:
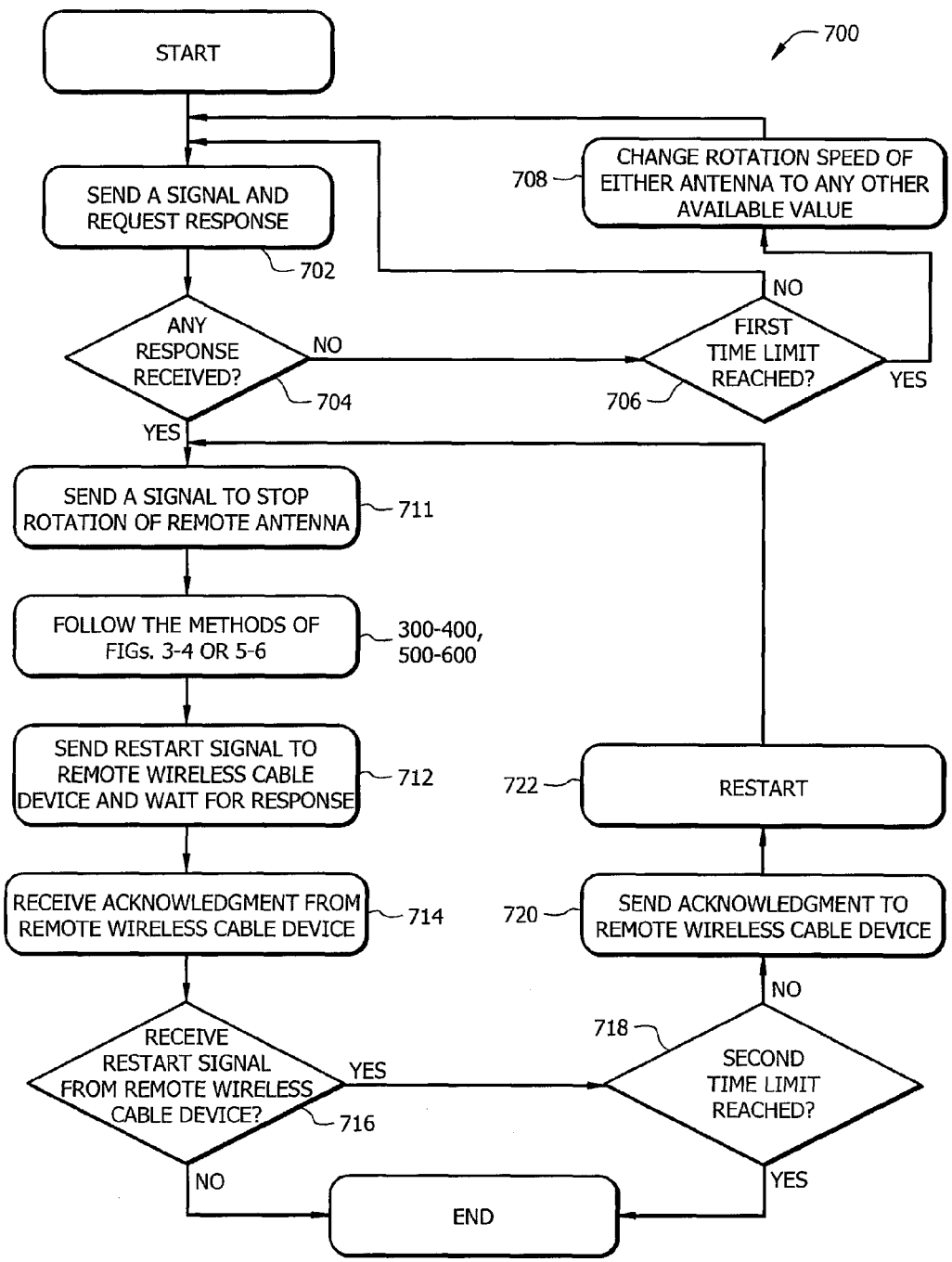
FIG. 7 is a schematic flowchart diagram illustrating a method for ensuring diversity of antenna rotation speeds during an antenna scan and for optimizing the antenna look angle according to one embodiment of the present invention.

Particularly in systems that include multiple directional antennas 202, if the directional antennas 202 of both the first wireless cable device 112 and the second wireless cable device 114 are set to the same rate of rotation, they may never come into direct communication. Consequently, even though the two devices may exist within the same environment, they may never discover one another. Accordingly, the rate of rotation of the directional antenna 202 on the first wireless cable device 112 may be set to a different rotation speed than the directional antenna 202 of the second wireless cable device 114. Specifically, the rotation speed of one directional antenna 202 is faster than that of the other. In one embodiment, the rates of rotation may be selected at random to reduce the chances of selecting the same speed. Alternatively, the process may be repeated at multiple different speeds to ensure discovery of all devices in a wireless cable environment 110. In one embodiment, the speeds may be adjusted in multiples of a base speed or fractions of a maximum speed. FIG. 7 below describes an embodiment of ensuring that the rotation speeds are different.

FIG. 7 is a schematic flowchart diagram illustrating a method 700 for ensuring diversity of antenna rotation speeds during an antenna scan. In one embodiment, the method 700 starts when the directional antenna 202 transmits 702 a wireless signal that includes a request for a response from a remote device. If the controller 216 determines 704 that a response was received, the method 700 may end. In an alternative embodiment, an antenna optimizing process as described below may be performed. If a response is not received 704, then the controller 216 determines 706 whether a first time limit has arrived 706. In one embodiment, the first time limit is the inverse of the current rotation speed. Other embodiments may include other time limits. The directional antenna 202 may continue to send 702 signals and request responses at the same rotation speed until the controller 216 determines 706 that the time limit has been reached. Once the time limit has been reached, the controller 216 is configured to change the rotation speed of the directional antenna. In one embodiment, any other rotation speed may be used. Alternatively, a set of rotation speeds may be used to simplify operations.

The method 700 may additionally include steps for optimizing the antenna look angle. In one embodiment, once a response is received 704, the directional antenna 202 may send 711 a signal to stop the rotation of the motor of the remote wireless cable device first, and then performs the methods of FIG. 3-4 or 5-6. To ensure that the antenna has not locked onto a local maximum value, the method 700 may include stop rotating, sending 712 a restart signal to the remote wireless cable device and waiting for a response. The remote wireless cable device may then send an acknowledgement signal in response 714. The remote wireless cable device may then restart, and perform the methods of FIG. 3-4 or 5-6 and send a restart signal back. If a restart signal is received 716 from the remote wires cable device, the antenna controller 216 may determine whether a second time limit has been reached 718. The second time limit may be any preset or agreed upon time limit. If the second time limit was reached, the method may simply end. If not, the wireless cable device may send 720 an acknowledgement to the remote wireless cable device, restart 722 and repeat the steps described above.

Figure 8A:
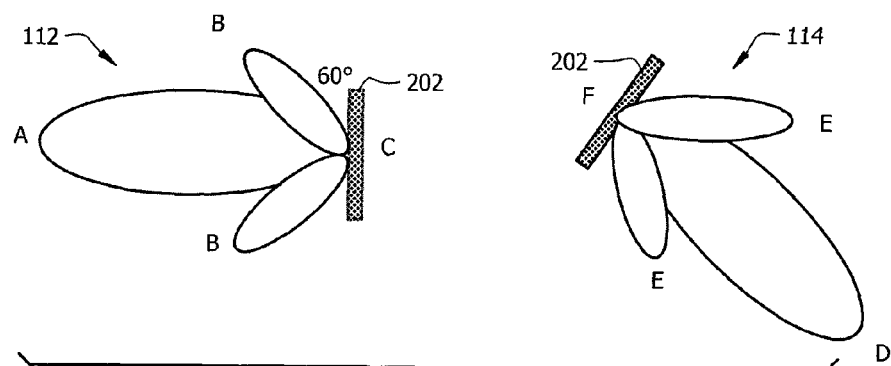
FIG. 8A is an antenna beam diagram illustrating an antenna arrangement suitable for signal detection according to one embodiment of the present invention.
Figure 8B:
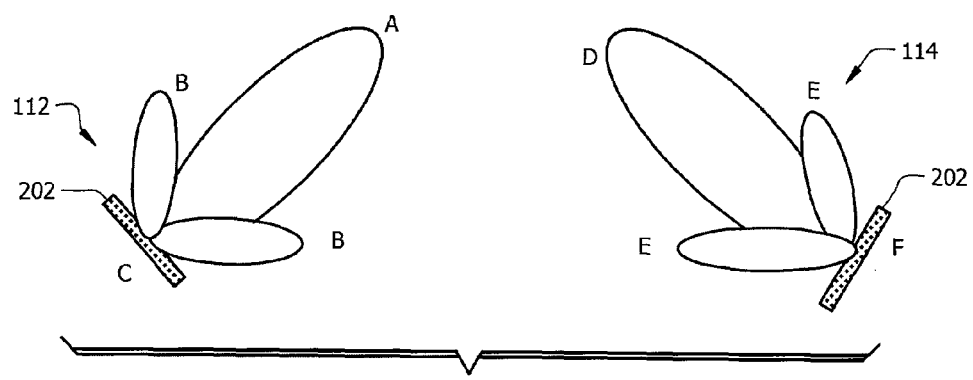
FIG. 8B is an antenna beam diagram illustrating an embodiment where two antennas are locked on sidelobe signals.

FIG. 8A is an antenna beam diagram illustrating an antenna arrangement suitable for signal detection according to one embodiment of the present invention. As discussed above, the two devices 112, 114 may not be able to detect each other based on signal detection requirement if they have the same rotation speed. If, however, the rotation speed of the second wireless cable device 114 is 1.2 times faster than that of the first wireless cable device 112, when the first wireless cable device 112 turns one hundred and fifty degrees, the two devices 112, 114 may discover the one another. In certain embodiments, as illustrated in FIG. 8B, the first device 112 or the second device 114 may only detect a sidelobe "E" or "B" of the other antenna 202. Indeed, FIG. 8B shows that each of the two devices 112, 114 may gain antenna lock based only upon sidelobe signals. Unfortunately, in such an embodiment, the signal transmitting from direction "B" may be received from direction "E", the process of signal detection may end. One drawback of such an embodiment is that the antenna controller 216 may only identify a local maximum, thus causing reducing the efficiency of communication between the first wireless cable device 112 and the second wireless cable device 114.

In one embodiment, an angle optimizing method may obtain an optimal angle of both antennas 202. For example, the signal transmitting from direction "A" may be received from direction "D" such that the antennas 202 can provide high gain for data exchange. To achieve this, the motor 218 of either device 112, 114 may stop rotating as long as the device can detect the other. Although this is not necessary, for illustrative purposes it is assumed that the first device 112 stops rotation. In one embodiment of the method, the second device 114 may determine a locally optimal antenna angle by following an embodiment of a two level optimization algorithm as described in FIG. 3-4 or 5-6. Then, the second device 114 may stop rotating and send a signal to restart the motor of the first device 112. Next, the first device 112 may respond with an acknowledgement and then establishes another local optimal value again by following an embodiment of an optimization algorithm such as the methods described above in FIG. 3-4 or 5-6. After that the first device 112 stops rotating and sends a signal to restart the motor of the second device 114. The second device 114 may respond with an acknowledgement and then establishes the local optimal value by following an embodiment of an optimization algorithm such as the methods described above in FIG. 3-4 or 5-6. After that the second device 114 stops rotating and sends a signal to restart the motor of the first device 112. This process may be repeated until a time threshold is reached. The time threshold may be present in the controller 216 of each device. Alternatively, the two devices 112, 114 may agree upon a time threshold during an initial acquisition and handshake.

In another embodiment, the second device 114 may include a dual antenna and the first device 112 may include only a single antenna. In this case, the transmission and reception of the traffic flow between devices is done using a dual antenna residing at the second device 114 and a single antenna residing at the first device 112. The dual antenna may include an omnidirectional antenna 204 used for signal detection and assisting directional antenna 202 in receiving data and a directional antenna 202 used for data exchange and assisting omnidirectional antenna 204 in detecting signals.

In these various embodiments, the controller 216 may select a random rotation speed from an available speed set for each directional antenna 202 when power is on. In embodiments that include a dual antenna, the apparatus 200 may include an antenna switching system for switching between omnidirectional antenna 204 and directional antenna 202. The antenna switching system may be included in the controller 216. Alternatively, the antenna switching system may be a separate component of the apparatus 200. During the process of signal detection this switching system may use a time-sharing mechanism, i.e. one antenna uses a time while the other uses the remaining time (1-) to transmit and receive signals, where 0 ? ? 1. In such an embodiment, both antennas may be used to establish a link within a timeslot. One advantage of a dual antenna system is that the apparatus may establish an optimal antenna position faster than that using only single antenna.

Figure 9:
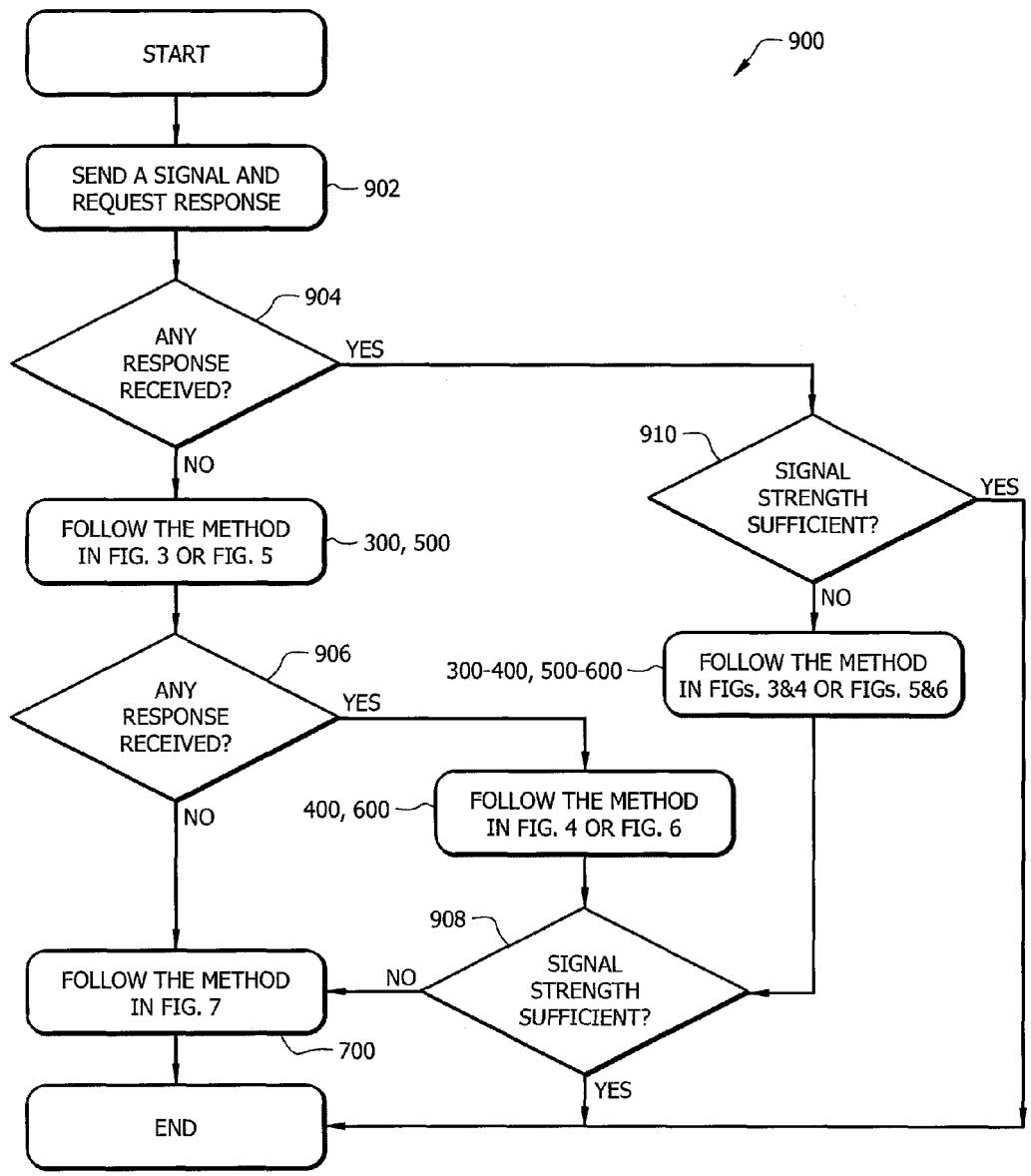
FIG. 9 is a schematic flowchart diagram illustrating a method for automatic signal detection and antenna angle optimizing in wireless cable devices having both an omnidirectional antenna and a directional antenna.

FIG. 9 is a schematic flowchart diagram illustrating an embodiment of a method 900 for automatic detection of a signal and tuning of an antenna angle in a wireless cable device 200 having both an omnidirectional antenna 204 and a directional antenna 202. This method 900 may include first checking to whether a link may be established using only the omnidirectional antenna 204, and then if the omnidirectional antenna 204 fails to establish a link, the directional antenna 202 may be manipulated by the antenna controller 216 to establish a link. For example, the method 900 may start when the omnidirectional antenna 204 transmits 902 a signal that includes a request for a response from a remote device. In an alternative embodiment, the omnidirectional antenna 204 may listen for a beacon or pilot signal from a remote device. The controller 216 may then determine 904 whether any response was received by the omnidirectional antenna 204. If a response was received 904, the method may end, because the link established by the omnidirectional antenna 204 may be sufficient. In another embodiment, the controller 216 or other component of the apparatus 200 may determine 910 whether the signal strength of the link is sufficient. If it is determined 910 that the signal strength is sufficient, the method may end. If it is determined 910 that the signal strength is not sufficient Alternatively, if no response was received, or the signal strength is determined 910 to be insufficient, the controller 216 may perform coarse signal acquisition process 300 and fine tuning signal acquisition process 400 described in FIGS. 3-4. Alternatively, the scanning method 500 of FIG. 5 and the search method 600 of FIG. 6 may be performed. If it is determined 908 that the signal strength obtained by one of the controllers 216 performing the method of FIG. 3-4 or 5-6 is insufficient, the method 700 described in FIG. 7 may be performed by both antennas to identify an antenna angle that provides a global maximum signal strength level.

If it is determined 904 that no response is received, the controller 216 may perform the methods 300 or 500 as described in FIGS. 3 and 5 respectively. If it is determined 906 that a response is received, the controller 216 may perform either method 400 or 600 as illustrated in FIGS. 4 and 6 respectively to determine an antenna position corresponding to a global maximum. If it is determined 906 that no response is received (e.g., the methods of FIG. 3-4 or 5-6 were insufficient to establish a link), then the controller 216 may perform the method 700 of FIG. 7 to change the rotation speed for identifying a second device 114 and determine a global maximum signal strength level. Upon completion of these processes, the method 900 may end.

If one wireless cable device 112 includes a dual antenna, but the other wireless cable device 114 only includes an omnidirectional antenna 204, then two options for establishing a link may be used. For example, if the link can be established by both omnidirectional antennas 204, and the signal strength is determined to be sufficient, then there is no need to use the directional antenna 202 of the dual antenna device 112. If however, it is determined that the signal strength is insufficient, or a link cannot be established, then the dual antenna device 112 may establish a link using either the methods described in FIGS. 3-4 or the methods described in FIGS. 5-6.

If one wireless cable device 112 includes a dual antenna, but the other wireless cable device 114 only includes a directional antenna 202, then a communication link may be established between the omnidirectional antenna 204 of the dual antenna device and the directional antenna 202 of the single antenna device 114 according to the methods described in either FIG. 3-4 or 5-6. If however, the link cannot be established, or the signal strength is determined to be insufficient, then the method described in FIG. 7 may be used to establish a communication link between the dual antenna device and the single antenna device 114 and to determine antenna positions for both directional antennas and thus providing a global maximum signal strength level.

In still a further embodiment, a second wireless cable device 114 may include an N directional antenna and the first wireless cable device 112 may use a single antenna. In this case, the transmission and reception of the traffic flow between devices is done using N (i.e. N=360/q) directional antennas residing at one device and a single antenna residing at the other, where q is the coverage angle of the directional antenna. In such an embodiment, the N directional antennas may act as an "omnidirectional" antenna. Again, the first wireless cable device 112 and the second wireless cable device 114 may be interchanged in the above description. In such an embodiment, embodiments of the scanning processes described above may be implemented by activating the individual directional antennas which may be held stationary rather than rotating a single antenna. For example, if each of the N directional antennas has a beam width that covers 10 degrees, then the N directional antenna may include 36 individual directional antennas. Combined, the thirty six individual elements may provide three hundred and sixty degrees of coverage. In various embodiments of the process above, rather than rotating the directional antennas, each individual antenna may be activated in a sequence to scan three hundred and sixty degrees of an environment and to determine which directional antennas are best positioned to communicate with a remote device. Upon identification of the optimal directional antenna elements, the remainder of the elements may be shut down. Such an embodiment may reduce overall system power consumption, but still provide high quality signal links. In embodiments where the first wireless cable device 112 includes an omnidirectional antenna 104, the N directional antenna may establish a link with the omnidirectional antenna 104 as though the N directional antenna were also an omnidirectional antenna. If the first wireless cable device 112 includes a directional antenna 202, the two devices 112, 114 may establish a link according to the methods described in FIG. 3-4 or 5-6.

In still a further embodiment, the antennas 202, 204 may be replaced with a digital smart antenna configured for electronic beamforming. The embodiments described above are described in relation to a different number of antennas residing at the two devices. The above methods have been described in terms of a directional antenna 202 that is mounted to a mounting assembly 206 containing mechanical components, such as a motor 218 configured to rotate in order to achieve the signal detection and angle optimization. However embodiments of these methods can also be achieved with a digital smart antenna, which can first estimate the direction of arrival (DOA) of the signal and then use it to calculate beamforming vectors, to track and locate the antenna beam on the target, and thus completing the process of signal detection and angle optimization. Thus the search algorithms described above may be achieved electronically using digital smart antennas and electronic beam forming processes.

The various steps of the methods described in FIGS. 3-7 above may be conducted by one or more hardware modules. In such embodiments, the hardware modules may include circuit cards with analog and/or digital circuit components arranged and configured to produce the steps of the methods. Examples of such circuit components may include resistors, capacitors, inductors, transistors, digital logic gates, signal latch devices, digital counter devices, amplifiers, and RF components. One of ordinary skill in the art will recognize various components and configurations that may be used to implement the described steps. In other embodiments, the steps may be carried out by hardware devices, such as Field Programmable Gate Arrays (FPGAs), Programmable Logic Controllers (PLCs), and other such hardware devices programmed with firmware configured to cause the hardware devices to carry out the steps of the methods. In other embodiments, the steps of the methods may be carried out by a microcontroller, a processor, a Digital Signal Processor (DSP) or other similar components configured to load and execute software instructions configured to cause the device to carry out operations of the method described above. Indeed, the computer readable code may be stored on a tangible computer readable medium, such as an attached memory device, a data disk, a detachable flash memory device, or the like. One of ordinary skill in the art will recognize various computer readable media that may be suitable for storing the computer readable instructions.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

identifying, using an antenna associated with a wireless cable device, a remote wireless cable signal source within an environment;

performing a coarse tuning process to identify one or more antenna positions in which a wireless cable signal is received from the remote wireless cable signal source by the antenna associated with the wireless cable device, wherein the coarse tuning process comprises rotating a motor at a first speed from a first position to a second position and recording a signal parameter at a plurality of intermediary positions between the first position and the second position, and wherein the coarse tuning process comprises identifying one or more candidate angles at which a signal is received from a remote wireless cable device; and performing a fine tuning process to identify an optimal antenna position for communication with the remote wireless cable signal source, wherein the fine tuning process comprises rotating the motor at a second speed through a plurality of angles from a position corresponding to a candidate angle of the one or more candidate angles identified by the coarse tuning, and wherein the plurality of angles provide an aggregate equal to one step of the rotating the motor between the plurality of intermediary positions at the first speed in the coarse tuning process.

2. The method of claim 1, wherein identifying comprises receiving a communication from the remote wireless cable signal source.

3. The method of claim 2, wherein the communication comprises receiving a beacon signal emitted by the remote wireless cable signal source.

4. The method of claim 1, wherein the signal parameter is selected from a group of single parameters consisting of Receive Signal Strength Indicator (RSSI), Bit Error Rate (BER), Packet Error Rate (PER), and response time.

5. The method of claim 1, wherein the first position and the second position are separated by three hundred and sixty (360) degrees or more.

6. The method of claim 1, wherein the fine tuning process is repeated at each of the one or more candidate angles recorded during the coarse tuning process.

7. The method of claim 6, wherein the fine tuning process comprises:

moving the antenna to a position associated with a signal parameter that indicates a candidate antenna angle;

rotating the antenna at the second speed to the next angle;

recording the signal parameter at the angle; and repeating the steps of rotating and recording until the antenna rotates a number of degrees equal to an angle increment at the first speed.

8. The method of claim 7, wherein the first speed is faster than the second speed.

9. A method comprising:

identifying, using an antenna associated with a wireless cable device, a remote wireless cable signal source within an environment;

scanning the environment to determine a direction associated with a signal parameter value indicating an optimal antenna position for communication with the remote wireless cable signal source; and searching for the direction associated with the signal parameter value indicating the optimal antenna position for communication with the remote wireless cable signal source identified during the scan of the environment, wherein the searching comprises:

rotating the antenna from a first position to a second position;

comparing a signal parameter received at each of a plurality of intermediary positions between the first position and the second position with a peak signal parameter value identified during the scan of the environment; and stopping the rotation of the antenna in response to a determination that the peak signal parameter value has been reached.

10. The method of claim 9, wherein identifying comprises receiving a communication from the remote wireless cable signal source.

11. The method of claim 10, wherein the communication comprises receiving a beacon signal emitted by the remote wireless cable signal source.

12. The method of claim 9, wherein scanning the environment comprises:

rotating the motor at a first speed;

detecting a signal from a remote wireless cable signal source at an intermediary position;

reducing the rate of rotation of the antenna to a second speed, the second speed being less than the first speed;

at a plurality of secondary positions, determining if a signal parameter received by the antenna is better than the signal parameter received by the antenna at the preceding position;

recording the signal parameter and further reducing the rate of rotation of the antenna to a third speed, the third speed being less than the second speed, in response to a determination that the signal parameter is better than the signal parameter received by the antenna at the preceding position;

repeating the recording step until a signal parameter received by the antenna is not better than the signal parameter received by the antenna at the preceding position or there is no response received from a remote wireless cable;

increasing the rate of rotation of the antenna to the speed that is equal to or higher than the last speed in response to a determination that the signal parameter received by the antenna is not better than the signal parameter received by the antenna at the preceding position; and increasing the rate of rotation of the antenna to the first speed in response to a determination that there is no response received from a remote wireless cable.

13. The method of claim 12, wherein scanning the environment comprises repeating the steps of claim 12 until a time threshold is reached.

14. The method of claim 12, wherein scanning the environment comprises repeating the steps of claim 12 until a physical position threshold is reached.

15. The method of claim 12, further comprising selecting a peak signal parameter from one or more recorded signal parameters.

16. A method comprising:

rotating an antenna associated with a wireless cable device at a first rotation rate within an environment to identify a signal from a remote wireless cable device within an environment;

determining whether the signal is received from the remote wireless cable signal sources within the environment;

changing the rate of rotation of the antenna to a second rotation rate in response to a determination that there is no response received from a remote wireless cable;

rotating the antenna at the second rotation rate within the environment to identify the signal from the remote wireless cable device;
repeating the steps of changing and rotating until a response is received from a remote wireless cable; and
optimizing the antenna directions in cooperation with the remote wireless cable device.

17. The method of claim 16, where optimizing the antenna directions in cooperation with the remote wireless cable device comprises:
sending a signal to stop rotation of the remote antenna;
performing a coarse tuning process to identify one or more antenna positions in which a wireless cable signal is received from the remote wireless cable signal source by the antenna associated with the wireless cable device;
performing a fine tuning process to identify a candidate antenna position for communication with the remote wireless cable signal source;
stopping rotating and instructing the remote wireless cable device to restart and allowing the remote wireless cable device to perform a coarse tuning process and a fine tuning process;
restarting in response to a determination that a restart signal is received from the remote wireless cable device; and
repeating the steps of sending signal to stop rotation of the remote antenna, performing a coarse tuning process, performing a fine tuning process, stopping rotating, instructing the remote wireless cable device to restart and restarting until a time limit is reached.

18. The method of claim 16, where optimizing the antenna directions in cooperation with the remote wireless cable device comprises:
sending a signal to stop rotation of the remote antenna;
scanning the environment, using the directional antenna with a variety of rotation speeds, to determine a direction associated with a signal parameter indicating a candidate antenna position for communication with the remote wireless cable signal source;
searching for the direction associated with the signal parameter value indicating the candidate antenna position for communication with the remote wireless cable signal source identified during the scan of the environment;
stopping rotating and instructing the remote wireless cable device to restart and allowing the remote wireless cable device to perform the steps of scanning and searching;
restarting in response to a determination that a restart signal is received from the remote wireless cable device; and
repeating the steps of sending, scanning, searching, stopping, instructing restart and restarting until a time limit is reached.

19. A method comprising:
scanning an environment, using an omnidirectional antenna, for a signal from a remote wireless cable signal source to establish a communication link;
switching to a directional antenna in response to a determination that a communication link cannot be established with the omnidirectional antenna;
performing a coarse tuning process to identify one or more antenna positions in which a wireless cable signal is received from the remote wireless cable signal source by the antenna associated with the wireless cable device;
performing a fine tuning process to identify an optimal antenna position for communication with the remote wireless cable signal source; and changing a rate of rotation of the directional antenna and optimizing the antenna directions in cooperation with the remote wireless cable device in response to a determination that a communication link cannot be established or the received signal strength by performing coarse tuning and fine tuning process is insufficient.

20. A method comprising:
scanning an environment, using an omnidirectional antenna, for a signal from a remote wireless cable signal source to establish a communication link;
switching to a directional antenna in response to a determination that a communication link cannot be established with the omnidirectional antenna;
scanning the environment, using the directional antenna with a variety of different rotation speeds, to determine a direction associated with a signal parameter indicating a candidate antenna position for communication with the remote wireless cable signal source;
searching for the direction associated with the signal parameter value indicating the candidate antenna position for communication with the remote wireless cable signal source identified during the scan of the environment; and
changing a rate of rotation of the directional antenna and optimizing the antenna directions in cooperation with the remote wireless cable device in response to a determination that a communication link cannot be established or the received signal strength by performing scanning and searching process is insufficient.

21. A system comprising:
a first wireless cable device having a directional antenna configured to receive a wireless cable signal from a remote wireless cable signal source, and an antenna controller coupled to the directional antenna and configured to perform a coarse tuning process to identify one or more antenna positions in which the wireless cable signal is received from the remote wireless cable signal source by the directional antenna, and perform a fine tuning process to identify an optimal antenna position for communication with the remote wireless cable signal source, wherein the coarse tuning process comprises rotating a motor at a first speed from a first position to a second position and recording a signal parameter at a plurality of intermediary positions between the first position and the second position, and wherein the coarse tuning process comprises identifying one or more candidate angles at which a signal is received from a remote wireless cable device, wherein the fine tuning process comprises rotating the motor at a second speed through a plurality of angles from a position corresponding to a candidate angle of the one or more candidate angles identified by the coarse tuning, and wherein the plurality of angles provide an aggregate equal to one step of the rotating the motor between the plurality of intermediary positions at the first speed in the coarse tuning process.

22. The system of claim 21, wherein the antenna control unit is configured to:
cause the directional antenna to move to a position associated with a signal parameter that indicates optimal candidate antenna angle;
cause the directional antenna to rotate at the second speed to the next angle;
record the signal parameter at the angle; and
repeat the steps of rotating and recording until the antenna rotates a number of degrees that is equal to an angle increment at the first speed.

23. The system of claim 22, wherein the antenna control unit is further configured to repeat the steps of claim 22 at each of the one or more recorded optimal candidate antenna angles.

24. The system of claim 21, further comprising a second wireless cable device having an omni-directional antenna configured to receive a wireless cable signal from the first wireless cable device and transmit a responsive wireless cable signal to the first wireless cable device.

25. A system comprising:
a first wireless cable device having a directional antenna configured to receive a wireless cable signal from a remote wireless cable signal source within an environment, and an antenna control unit coupled to the directional antenna and configured to scan the environment to determine a direction associated with a signal parameter value indicating an optimal antenna position for communication with the remote wireless cable signal source, and search for the direction associated with the signal parameter value indicating the optimal antenna position for communication with the remote wireless cable signal source identified during the scan of the environment, wherein the antenna control unit is configured to cause the directional antenna to rotate from a first position to a second position, compare a signal parameter received at each of a plurality of intermediary positions between the first position and the second position with the peak signal parameter value identified during the scan of the environment, stop the rotation of the antenna in response to a determination that the peak signal parameter value has been reached.

26. The system of claim 25, wherein the antenna control unit is configured to:
cause the directional antenna to rotate at a first speed;
detect a signal from a remote wireless cable signal source at an intermediary position;
reduce the rate of rotation of the antenna to a second speed, the second speed being less than the first speed;
at a plurality of secondary positions, determine if a signal parameter received by the antenna is better than the signal parameter received by the antenna at the preceding position;
record the signal parameter and further reduce the rate of rotation of the antenna to a third speed, the third speed being less than the second speed, in response to a determination that the signal parameter is better than the signal parameter received by the antenna at the preceding position;
repeat the recording step until a signal parameter received by the antenna is not better than the signal parameter received by the antenna at the preceding position or there is no response received from a remote wireless cable;
increase the rate of rotation of the antenna to the speed that is equal to or higher than the last speed in response to a determination that the signal parameter received by the antenna is not better than the signal parameter received by the antenna at the preceding position; and
increase the rate of rotation of the antenna to the first speed in response to a determination that there is no response received from a remote wireless cable.

27. The system of claim 25, further comprising a second wireless cable device having an omni-directional antenna configured to receive a wireless cable signal from the first wireless cable device and transmit a responsive wireless cable signal to the first wireless cable device.

28. A system comprising:
a first wireless cable device having a first directional antenna and a second wireless cable device having a second directional antenna, the second wireless cable device configured to, send a response signal to the first wireless cable device, the first wireless cable device configured to:
rotate the first directional antenna at a first rotation rate to identify a signal from the second wireless cable device;
determine whether the signal is received from the second wireless cable device;
change the rate of rotation of the first directional antenna to a second rotation rate in response to a determination that there is no response received from the second wireless cable device;
rotate the first directional antenna at the second rotation rate to identify the signal from the second wireless cable device;
repeat the steps of changing and rotating until a response is received from the second wireless cable device; and
optimize the antenna directions in cooperation with the second wireless cable device.

29. The system of claim 28, where the first wireless cable device is further configured to:
send a signal to stop rotation of the second antenna;
perform a coarse tuning process to identify one or more antenna positions in which a wireless cable signal is received from the second wireless cable device by the first directional antenna;
perform a fine tuning process to identify a candidate antenna position for communication with the second wireless cable device;
stop rotating and instruct the second wireless cable device to restart and allow the second wireless cable device to perform a coarse tuning process and a fine tuning process;
restart in response to a determination that a restart signal is received from the second wireless cable device; and
repeat the steps of sending signal to stop rotation of the remote antenna, performing a coarse tuning process, performing a fine tuning process, stopping rotating, instructing the second wireless cable device to restart and restarting until a time limit is reached.

30. The system of claim 28, where the first wireless cable device is further configured to:
send a signal to stop rotation of the second directional antenna;
scan the environment, using the first directional antenna with a variety of different rotation speeds, to determine a direction associated with a signal parameter indicating a candidate antenna position for communication with the second wireless cable device;
search for the direction associated with the signal parameter value indicating the candidate antenna position for communication with the second wireless cable device identified during the scan of the environment;
stop rotating and instruct the second wireless cable device to restart and allow the second wireless cable device to perform the steps of scanning and searching;
restart in response to a determination that a restart signal is received from the second wireless cable device; and
repeat the steps of sending, scanning, searching, stopping, instructing restart and restarting until a time limit is reached.

31. A system comprising:

a first wireless cable device comprising a first omnidirectional antenna and a first directional antenna, and a second wireless cable device having a second omnidirectional antenna and a second directional antenna, the first wireless cable device configured to:

scan an environment, using the first omnidirectional antenna, for a signal from the second wireless cable device to establish a communication link;

switch to the first directional antenna in response to a determination that a communication link cannot be established with the first omnidirectional antenna;

perform a coarse tuning process to identify one or more antenna positions in which a wireless cable signal is received from the second wireless cable device by the first directional antenna;

perform a fine tuning process to identify an optimal antenna position for communication with the second wireless cable device; and change a rate of rotation of the first directional antenna and optimize the antenna directions in cooperation with the second wireless cable device in response to a determination that a communication link cannot be established or the received signal strength by performing coarse tuning and fine tuning process is insufficient.

32. A system comprising:

a first wireless cable device comprising a first omnidirectional antenna and a first directional antenna, and a second wireless cable device having a second omnidirectional antenna and a second directional antenna, the first wireless cable device configured to:

scan an environment, using an omnidirectional antenna, for a signal from the second wireless cable device to establish a communication link;

switch to the first directional antenna in response to a determination that a communication link cannot be established with the first omnidirectional antenna;

scan the environment, using the first directional antenna with a variety of different rotation speeds, to determine a direction associated with a signal parameter indicating a candidate antenna position for communication with the second wireless cable device;

search for the direction associated with the signal parameter value indicating the candidate antenna position for communication with the second wireless cable device identified during the scan of the environment; and change a rate of rotation of the first directional antenna and optimize the antenna directions in cooperation with the second wireless cable device in response to a determination that a communication link cannot be established or the received signal strength by performing scanning and searching process is insufficient.

33. A non-transitory computer readable medium comprising computer readable code that, when executed by a processing device, cause the processing device to perform operations comprising:

identifying, using an antenna associated with a wireless cable device, a remote wireless cable signal source within an environment;

performing a coarse tuning process to identify one or more antenna positions in which a wireless cable signal is received from the remote wireless cable signal source by the antenna associated with the wireless cable device, wherein the coarse tuning process comprises rotating a motor at a first speed from a first position to a second position and recording a signal parameter at a plurality of intermediary positions between the first position and the second position, and wherein the coarse tuning process comprises identifying one or more candidate angles at which a signal is received from a remote wireless cable device; and performing a fine tuning process to identify an optimal antenna position for communication with the remote wireless cable signal source, wherein the fine tuning process comprises rotating the motor at a second speed through a plurality of angles from a position corresponding to a candidate angle of the one or more candidate angles identified by the coarse tuning, and wherein the plurality of angles provide an aggregate equal to one step of the rotating the motor between the plurality of intermediary positions at the first speed in the coarse tuning process.

34. A non-transitory computer readable medium comprising computer readable code that, when executed by a processing device, cause the processing device to perform operations comprising:

identifying, using an antenna associated with a wireless cable device, a remote wireless cable signal source within an environment;

scanning the environment using the directional antenna with a variety of different speeds to determine a direction associated with a signal parameter value indicating an optimal antenna position for communication with the remote wireless cable signal source; and searching for the direction associated with the signal parameter value indicating the optimal antenna position for communication with the remote wireless cable signal source identified during the scan of the environment, wherein the searching comprises:

rotating the antenna from a first position to a second position;

comparing a signal parameter received at each of a plurality of intermediary positions between the first position and the second position with a peak signal parameter value identified during the scan of the environment; and stopping the rotation of the antenna in response to a determination that the peak signal parameter value has been reached.

35. A non-transitory computer readable medium comprising computer readable code that, when executed by a processing device, cause the processing device to perform operations comprising:

rotating an antenna associated with a wireless cable device at a first rotation rate within an environment to identify a signal from a remote wireless cable device within an environment;

determining whether the signal is received from the remote wireless cable signal sources within the environment;

changing the rate of rotation of the antenna to a second rotation rate in response to a determination that there is no response received from a remote wireless cable;

rotating the antenna at the second rotation rate within the environment to identify the signal from the remote wireless cable device;

repeating the steps of changing and rotating until a response is received from a remote wireless cable; and optimizing the antenna directions in cooperation with the remote wireless cable device.

36. The non-transitory computer readable medium of claim 35, where optimizing the antenna directions in cooperation with the remote wireless cable device comprises:

sending a signal to stop rotation of the remote antenna;
performing a coarse tuning process to identify one or more antenna positions in which a wireless cable signal is received from the remote wireless cable signal source by the antenna associated with the wireless cable device;
performing a fine tuning process to identify a candidate antenna position for communication with the remote wireless cable signal source;
stopping rotating and instructing the remote wireless cable device to restart and allowing the remote wireless cable device to perform a coarse tuning process and a fine tuning process;
restarting in response to a determination that a restart signal is received from the remote wireless cable device; and
repeating the steps of sending signal to stop rotation of the remote antenna, performing a coarse tuning process, performing a fine tuning process, stopping rotating, instructing the remote wireless cable device to restart and restarting until a time limit is reached.

37. The tangible non-transitory computer readable medium of claim 35, where optimizing the antenna directions in cooperation with the remote wireless cable device comprises:
sending a signal to stop rotation of the remote antenna;
scanning the environment, using the directional antenna with a variety of rotation speeds, to determine a direction associated with a signal parameter indicating a candidate antenna position for communication with the remote wireless cable signal source;
searching for the direction associated with the signal parameter value indicating the candidate antenna position for communication with the remote wireless cable signal source identified during the scan of the environment;
stopping rotating and instructing the remote wireless cable device to restart and allowing the remote wireless cable device to perform the steps of scanning and searching;
restarting in response to a determination that a restart signal is received from the remote wireless cable device; and
repeating the steps of sending, scanning, searching, stopping, instructing restart and restarting until a time limit is reached.

38. A non-transitory computer readable medium comprising computer readable code that, when executed by a processing device, cause the processing device to perform operations comprising:
scanning an environment, using an omnidirectional antenna, for a signal from a remote wireless cable signal source to establish a communication link;
switching to a directional antenna in response to a determination that a communication link cannot be established with the omnidirectional antenna;
performing a coarse tuning process to identify one or more antenna positions in which a wireless cable signal is received from the remote wireless cable signal source by the antenna associated with the wireless cable device;
performing a fine tuning process to identify an optimal antenna position for communication with the remote wireless cable signal source; and
changing a rate of rotation of the directional antenna and optimizing the antenna directions in cooperation with the remote wireless cable device in response to a determination that a communication link cannot be established or the received signal strength by performing coarse tuning and fine tuning process is insufficient.

39. A non-transitory computer readable medium comprising computer readable code that, when executed by a processing device, cause the processing device to perform operations comprising:
scanning an environment, using an omnidirectional antenna, for a signal from a remote wireless cable signal source to establish a communication link;
switching to a directional antenna in response to a determination that a communication link cannot be established with the omnidirectional antenna;
scanning the environment, using the directional antenna with a variety of rotation speeds, to determine a direction associated with a signal parameter indicating a candidate antenna position for communication with the remote wireless cable signal source;
searching for the direction associated with the signal parameter value indicating the candidate antenna position for communication with the remote wireless cable signal source identified during the scan of the environment; and
changing a rate of rotation of the directional antenna and optimizing the antenna directions in cooperation with the remote wireless cable device in response to a determination that a communication link cannot be established or the received signal strength by performing scanning and searching process is insufficient.

* * * * *

UNITED STATES PATENT AND TRADEMARK OFFICE
CERTIFICATE OF CORRECTION

PATENT NO.       : 8,704,711 B2                          Page 1 of 1
APPLICATION NO.  : 13/218099
DATED            : April 22, 2014
INVENTOR(S)      : Zizhou Vincent Wang et al.

It is certified that error appears in the above-identified patent and that said Letters Patent is hereby corrected as shown below:

In the Claims

At column 22, claim number 28, line number 5, delete "to," and replace with --to--.
At column 25, claim number 37, line number 20, delete "tangible".

Signed and Sealed this
Twenty-fourth Day of June, 2014

Michelle K. Lee
*Deputy Director of the United States Patent and Trademark Office*